Figure 1:
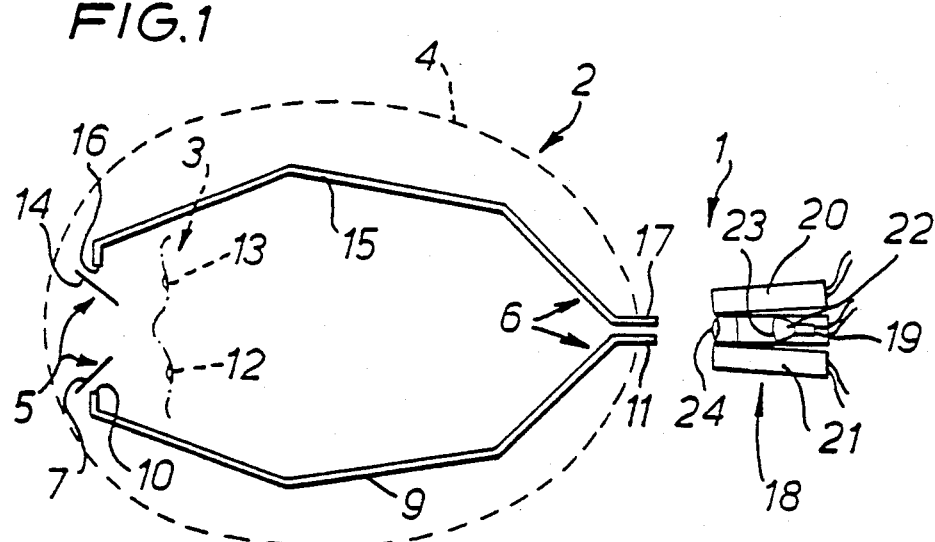

United States Patent [19]

Ruder

[11] Patent Number: 4,508,424

[45] Date of Patent: Apr. 2, 1985

[54] BINOCULAR DISPLAY OF INFORMATION WITH TWO COMBINER MEANS

[76] Inventor: Nils I. A. Ruder, The Potteries, Wickham Rd., Fareham, Hampshire, England

[21] Appl. No.: 457,072

[22] PCT Filed: May 7, 1982

[86] PCT No.: PCT/GB82/00138

§ 371 Date: Dec. 28, 1982

§ 102(e) Date: Dec. 28, 1982

[87] PCT Pub. No.: WO82/03923

PCT Pub. Date: Nov. 11, 1982

[30] Foreign Application Priority Data

May 8, 1981 [GB] United Kingdom ............... 8114177

[51] Int. Cl.³ ............................................. G02B 27/10
[52] U.S. Cl. ........................................................ 350/174
[58] Field of Search ............... 350/174, 145, 146, 538, 350/547, 548, 549, 291, 298

[56] References Cited

U.S. PATENT DOCUMENTS

| | | | |
|---|---|---|---|
| 3,059,519 | 10/1962 | Stanton | 350/145 |
| 3,230,819 | 1/1966 | Noxon | 350/174 |
| 3,410,638 | 11/1968 | Langworthy | 350/547 |
| 3,603,667 | 1/1971 | Freeman | 350/145 |
| 3,614,314 | 10/1971 | Rossire | 350/174 |
| 3,748,016 | 7/1973 | Rossire | 350/174 |
| 4,220,400 | 9/1980 | Vizenor | 350/174 |
| 4,398,799 | 8/1983 | Swift | 350/174 |

FOREIGN PATENT DOCUMENTS

| | | | |
|---|---|---|---|
| 1250461 | 10/1971 | United Kingdom | 350/174 |
| 1527049 | 10/1978 | United Kingdom | |

Primary Examiner—Jon W. Henry
Attorney, Agent, or Firm—William R. Hinds

[57] ABSTRACT

Binocular apparatus for transmitting an image of a single information source 1 to each eye 12, 13 of an observer comprises a support (e.g. a helmet) 4 to be worn on the observer's head, combiner means 5 positioned on the support in the field of view of both the observer's eyes, an information source 1 providing a collimated supply of information and mounted behind the observer to transmit an identical image of the information source to each eye by endoscope means 6, attached to the support 4 via the combiner means; the inputs 11, 17 to the endoscope means being either close to one another or a single input and arranged so that the single information source is contained within the field of view of the endoscope inputs or input and so that the optical center axis of the combiner means 5 is parallel to the optical axis of the endoscope inputs or input.

8 Claims, 3 Drawing Figures

U.S. Patent  Apr. 2, 1985  Sheet 1 of 2  4,508,424

BINOCULAR DISPLAY OF INFORMATION WITH TWO COMBINER MEANS

This invlention relates to apparatus for displaying information, and especially, although not exclusively, to apparatus for displaying information to the pilot of an aircraft.

The most commonly used method of displaying information to an aircraft pilot is to arrange information-providing instruments in front of the pilot, out of the field of view which he has when observing the outside world through his cockpit window. As the instruments are generally arranged below that field of view, this system is known as the head-down display (HDD) system. In the simpler type of HDD system, the uncollimated HDD system, the instruments are of the type having an instrument display face (dial (analog) or counter (digital) or other (symbolic) or image forming device such as a cathode ray tube CRT) on which it is necessary for the pilot to focus, as in simple dial display devices or CRT display devices, for example. If a pilot who is observing the outside world wishes to study information displayed by such a system, he has to avert his gaze in the direction of the relevant instrument (this will take, say, one tenth of a second), refocus his eyes from infinity to the distance of the relevant instrument display face (this will take about ½ second), absorb the relevant information, move his gaze back to the outside world (another tenth of a second, say), and then re-focus at infinity (about ½ second, again). Thus, in addition to the time taken to study the instrument display and the relatively small period of the order of one fifth of a second in gaze movement, the time which the pilot partly loses in his study of the outside world includes a total period of about 1 second in re-focussing time.

The only extensive use of collimated HDD systems to date has been in the field of moving maps where, because the image is necessarily optically developed, it has been found convenient to produce a collimated image. Otherwise, even the use of modern CRT displays in the HDD mode have been in the uncollimated form. In recent years certain display systems have been developed with a view to overcoming this drawback.

A system known as the HUD (head-up display) system has been developed for use in fixed-wing aircraft. In this system a collimated image of a graticule is presented in the pilot's normal field of view, i.e. in the pilot's normal field of view when observing the outside world. The system works in the following way: a combiner (a "half-silvered mirror", i.e. a transparent sheet having a partially transparent, reflective coating) is mounted in front of the pilot in his normal field of view at such an orientation that the pilot can simultaneously see (a) the outside world, through the combiner, and (b) a reflected image of a suitably positioned optical device which presents to the combiner a collimated image of a graticule; the collimated image is produced in the same manner as in the above-described collimated HDD system. Thus, the pilot can study the information presented by the HUD information at the same time as studying the outside world.

There are certain problems inherent in the use of the HUD system in fixed-wing aircraft. Firstly, there are limitations on how close to the point the device can be mounted, since it is necessary to maintain both the crash clearance (the clearance which must be maintained in front of the pilot to protect him from colliding with equipment when thrown forward against his strapping in a crash) and, where the aircraft is fitted with an ejector seat, the 'ejector seat clearance' (for parts of the pilot's body such as knees, feet, etc.). It will be appreciated that the further away the HUD apparatus is from the pilot, the larger must be the size of both the combiner and the collimated optical device in order to produce an image of a required size (as perceived by the pilot) of the reticule. The space envelope in the nose of the aircraft, where the collimated optical device is mounted, is at a very high premium, especially in a jet-fighter type of aircraft, so that it is necessary to limit the size of the device as much as possible. Of course, the larger the collimated optical device, the greater its weight, and the larger the mounting bracket required to mount it, again leading to excessive intrusion into the high premium nose space envelope of the aircraft.

In practice it has been found that the horizontal field of view obtainable with conventional optics is of the order of 15°, using a 14 cm diameter lens, and, even with modern holographically produced diffraction optics, the field of view can only extend to a horizontal width of 30°.

A second problem is that all the information supplied to the collimated optical device comes from a central computer or other sources, which are mounted behind the pilot, so that they have to be supplied through a bundle of cables, which further adds undesirable bulk and weight to the system.

A third disadvantage with the HUD system is that, because of the manner in which it has to be positioned in front of the pilot, it is exposed to the ambient light in the cockpit, and thus is liable to be exposed to daylight, in particular strong sunlight. This can give rise to spurious ('ghost') images being reflected to the pilot to confuse the primary information which is presented by the unit. Also, sunlight entering the collimator lens system can be focussed on the reticule of the instrument and thus damage it.

The above-described HUD system has not been adopted at all in rotary-wing aircraft (helicopters), because of problems, additional to those indicated above which are inherent in helicopters. Firstly, the structure of a rotary-wing aircraft in its front section is such that it carries a maximum amount of glassed area to give the pilot the advantage of having an aircraft that can move and hover, for which he needs look-down vision to a greater degree than in a modern fixed-wing aircraft. If the above-described HUD system were installed in a helicopter, the collimated optical device of the system would obscure a substantial part of the pilot's view out of the helicopter. Also, helicopters do not have the sort of structure in front of the pilot that would be required to mount such a system. Furthermore, the vibrations present in helicopters are of such amplitude and frequency that the combiner of any such system mounted in a helicopter would be likely to vibrate to cause unacceptable blurring of the displayed images.

To solve the afore-mentioned problems of displaying information to a pilot in a helicopter, apparatus known as a helmet-mounted display (HMD) has been proposed; see, for example, "Helmet Mounted Displays: Design Considerations" by H. L. Task, D. F. Kocian and J. H. Brindle, in AGARDograph No. 255, "Advancement on Visualization Techniques" edited by W. H. Hollister, and published by North Atlantic Treaty Organization Advisory Group for Aerospace Research and Development. This works in the following way:

fixed to the pilot's helmet in front of both (or, more usually, one only) of the pilot's eyes is a small combiner at such an orientation that the pilot can simultaneously see (a) the outside world, through the combiner, and (b) a reflected image of an instrument device which is positioned in the helmet above the combiner, and which presents to the combiner a collimated image of a reticule such as the screen of a miniature CRT; the collimated image is produced by means of a lens system, as in the collimated HDD system described above. This system has the advantage that the pilot can have a wide field of view into his display but also has the following disadvantages. First of all, the whole of the instrument device (CRT device plus collimating lens system) has to be miniaturised to a great degree to fit inside the helmet, and it has proved difficult to produce an adequate image resolution in the reticule. Secondly, and more importantly, it is not possible to provide within (or on) the helmet the units that will power the display and generate the information to be displayed, so that it is necessary to mount these units in the airframe, and to connect them to the helmet device by means of a cable, which is of course an inconvenience. Thirdly, and this is probably the major drawback, the system has the inherent complication that when the pilot moves his head (and the helmet with it), then the information displayed also moves relative to the airframe and the outside world, whereas, for most purposes (notably where the information displayed is essential flight information, etc.), it is necessary to eliminate such movement. This has given rise to the need for complicated mechanical or optical devices for sensing helmet movement, and feeding this information into a computer which then modifies the display input to correct for the helmet movement.

An example of an HDD system, especially for the display of a radar beacon relative to the runway of an aircraft is described in United Kingdom Patent Specification No. 999840 (Bendix Corporation). This specification describes binocular apparatus for transmitting an image of an information source to each eye of an observer comprising a support to be worn on the observer's head, combiner means to be positioned on the support in the field of view of both the observer's eyes, an information source, which provides a collimated display of information, mounted behind the observer, and light transmission means attached to the support to transmit an image of the information source to each of the observer's eyes via the combiner means.

The principal disadvantage of this HDD system is, with its mirror system, the observer/pilot sees true images up and down and false images side to side so that head movement can produce different effects in the images present to each eye. The wide separation of the two telescopes enhances this effect, necessitating the use of a mosaic information source displaying many images of the same information.

It is an object of the present invention to overcome this disadvantage.

According to the present invention, an identical image of a single information source is transmitted to each of the observer's eyes by endoscope means, the inputs to the endoscope means being either close to one another or a single input, being arranged so that the single information source is contained within the field of vision of the endoscope inputs or input and so that the optical centre of the combiner means is parallel to the optical axis of the endoscope inputs or input.

Thus, it will be appreciated that it is possible in accordance with the invention to provide apparatus which is capable of displaying information superimposed on a person's field of view, without reducing that field of view; while at the same time obviating any need for any physical connection between that person and the environment in wich he is situated.

The endoscope means to be employed in the apparatus of the invention may be any device which is capable of piping vision. Thus, it may in fact be an endoscope. Endoscopes are used medically for internal examinations, and comprise systems of lenses and, where it is necessary for the endoscope to deviate from a straight line, mirrors. At the present time, it is preferred that the endoscope means should be an endoscope, because of the high optical resolution obtainable with them. However, an alternative form of endoscope means is a fibroscope. A fibroscope is a flexible form of endoscope means, and comprises a bundle of optical fibres. The larger the number of fibres within a given size of fibroscope, the greater the optical resolution obtainable, but at present the resolution obtainable with a given size of fibroscope is lower than that obtainable with a comparable endoscope.

Normally, the optical input of the endoscope means will be positioned at the rear of the support, so as to be 180° from the straight ahead line of vision of the observer.

For most uses of the apparatus of the invention the information source will comprise a plurality of information-display instruments. When the information-display apparatus is to be employed in an aircraft the information-display instruments may include a first bank of instruments to be viewable by the wearer when looking straight ahead, for HUD. Additionally, the information-display instruments can include a second bank of instruments, disposed above the first bank, to be viewable by the wearer when looking downwardly, for HDD.

When the apparatus of the invention is used in an aircraft, behind the observer (i.e. the pilot), the chance that ambient light will impair the quality of the display is much less than in known HUD systems. This risk may be reduced still further by arranging that at least the region of the exterior of the helmet adjacent the optical input of the endoscope means is non-reflecting e.g. matt black.

As each eye of the observer is separately supplied, via its own endoscope device, with its own image, as described above, as the image supplied to each eye consists of the same item of information coming from the same information-display instrument, and as the optical inputs of the endoscope means are, in one embodiment, positioned as close together as practically possible; the result is that the closer together these two optical inputs, the smaller the size of the image-forming display required, for a given required angle of final image as perceived by the observer. This gives rise to the added advantage that more individual information-display instruments can be packed within a given "field of view" of the optical input of the endoscope means. In the alternative embodiment, this spacing is eliminated entirely, by the use of a single optical input and at some point thereafter splitting the single input to provide images for the combiner means. In practice, this might carry a penalty of loss of image intensity, if a system of "semi-coated" mirrors or prisms were to be used.

In many applications the information-providing information source can be incorporated in a seat such that the observer sitting in the seat can view images from the information source, in the manner described above. However, it is in most cases more convenient to mount the information source behind the seat, such as to the airframe, and to provide optical repeating means in the seat to transmit the information from the source to the endoscope means inputs or input.

While, as indicated above, the primary intended application of the apparatus is in aircraft, other situations where it could be employed will readily occur.

While the apparatus is well suited for any kind of fixed-wing aircraft, it will be apparent that it will be particularly useful in a fast aircraft such as a fighter having a minimum size of nose, because the apparatus can readily provide more information than can be provided by the combination of the known HUD and HDD devices now available in fighter aircraft, without taking up any of the premium space in the nose of the aircraft.

The apparatus of the invention is also particularly useful for use in a helicopter, because it can provide in a simple helmet device both HUD and HDD functions, without any need to connect the pilot by cable to the helicopter, and without any need for any helmet movement sensing apparatus.

Figure 2:
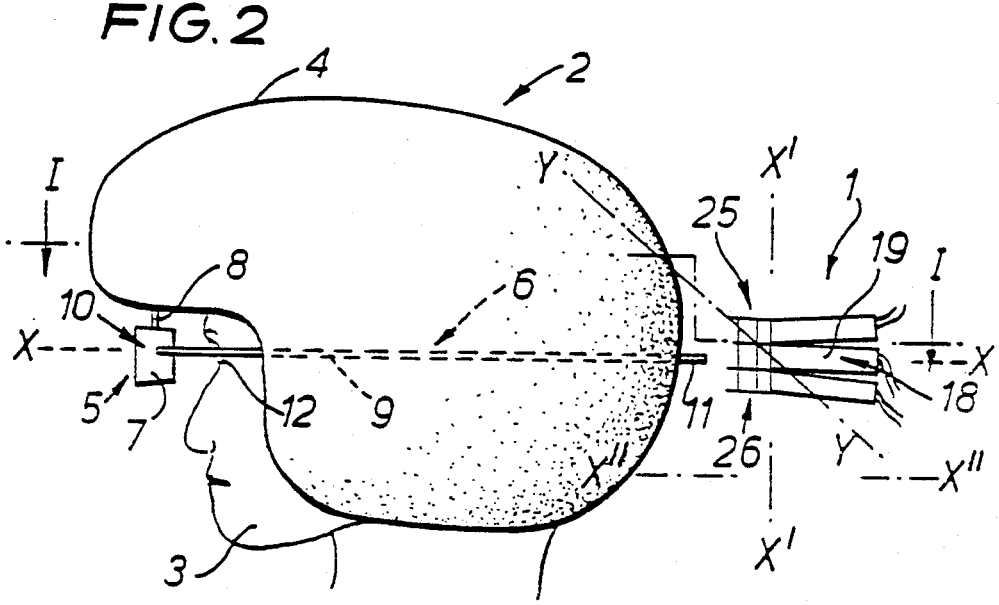
Figure 3:
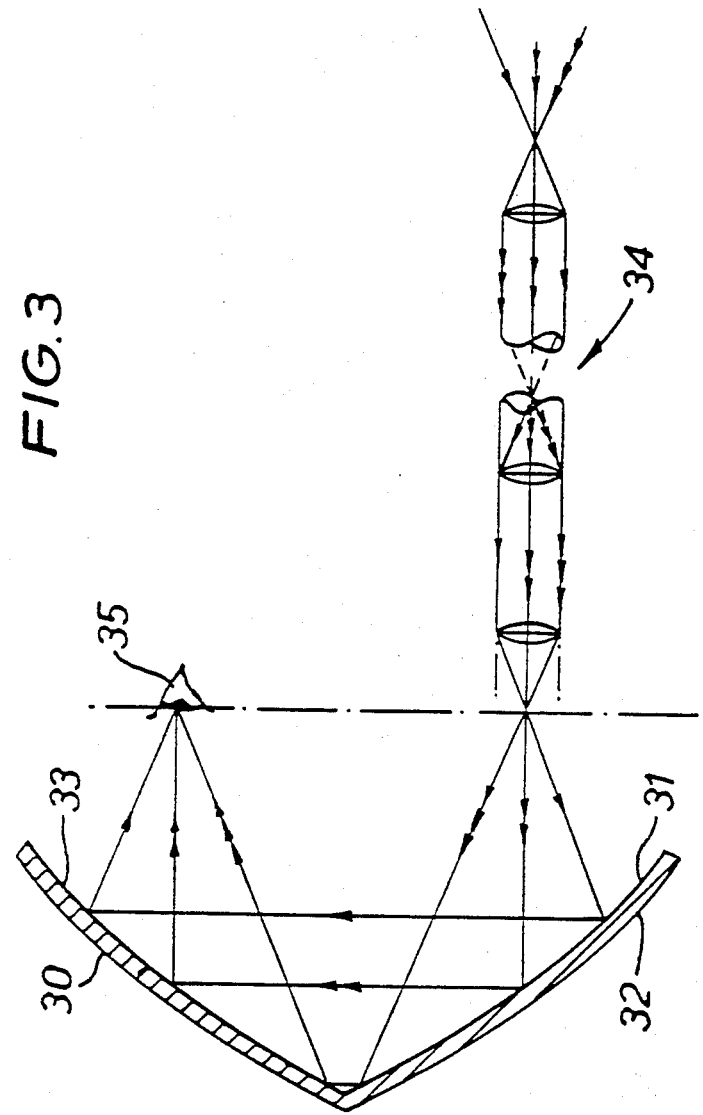

The invention is illustrated, by way of example, on the accompanying drawings, wherein:

FIG. 1 is a schematic sectional view, on the line I—I of FIG. 2, of a pilot's helmet provided with display apparatus in accordance with the invention, FIG. 2 is a side view of the apparatus of FIG. 1, and FIG. 3 is a vertical section of an alternative form of combiner.

The complete apparatus shown in FIGS. 1 and 2 is for the display of information and is generally described as a Rear View Display (RVD) system. It comprises an image-provding information source, shown generally at 1, the RVD unit, and a specially equipped helmet, the RVD helmet, and which is shown generally at 2. The RVD system as shown in the figures is primarily intended for use by the pilot of an aircraft, and in use the RVD helmet 2 will be worn on the head of the pilot; the pilot's head being indicated at 3. In use, the RVD unit is mounted out of the normal field of view of the pilot at the rear of the RVD helmet 2, so that the centre line of the RVD unit is mounted on the line of sight of the pilot, X—X.

The RVD helmet 2 comprises a helmet proper 4, a combiner means, shown generally at 5, which is positioned on the helmet so as to be in the pilot's field of view so that the pilot can see through it, and endoscope means shown generally at 6.

In a first arrangement, as shown in the drawings, the combiner means 5 comprises a first combiner device 7 positioned, by means of a support 8 connecting it to the helmet 4, to be in the field view of the pilot's left eye, and the endoscope means 6 comprises a first endoscope device 9, in the form of a conventional type of endoscope, and having an optical output 10 directed towards the first combiner device 7. The optical input 11 of the endoscope device 9 is positioned for receiving images provided by the RVD unit 1. The first combiner device 7 and the optical output 10 are so orientated that the pilot will see images from the RVD unit 1, via the first endoscope device 9 and the combiner device 7, superimposed on his view of the outside world seen through the combiner device 7. As shown, the combiner device 7 is angled at 45° to the line of straight ahead vision of the left eye (shown at 12) of the pilot, and the optical output 10 of the combiner device 7 is directed towards the combiner device 7 so as to be angled at 45° to it. However, it will readily be appreciated that the same straight ahead type of image display can be achieved with any other suitable combination of orientations of the optical output 9 and the combiner device 7.

Similar provision is made to display images from the RVD unit 1 to the right eye of the pilot, which is shown at 13. Thus, the combiner means 5 also comprises a second device 14 positioned to be in the field of view of the right eye 13, and the endoscope means 6 also comprises a second endoscope device 15 having an optical output 16 directed towards the combiner device 14 for presenting images received from the RVD unit 1 by the optical input 17 of the endoscope device 15 to be superimposed on the view seen by the right eye through the combiner device 14, in a manner entirely analogous to that by which information is displayed to the left eye as described above.

The RVD unit 1 comprises a first bank 18 of instruments, and the central one of these is shown in schematic detail at 19, and the outline of the immediate neighbours of instrument 19 can be seen at 20 and 21 in FIG. 1. In fact bank 18 will in practice include a whole series of instruments, extending on both sides of the central instrument 19. Bank 18 is mounted in the plane which contains the straight ahead lines of sight of the pilot's eyes, and thus provides a head-up type of display to the pilot.

As indicated schematically in FIG. 1, in connection with instrument 19, an instrument of the RVD unit 1 may comprise a CRT 22, the reticule of the instrument being the screen 23 of the CRT.

The images provided by the RVD unit 1 should be collimated images, and, indicated schematically at 24, is a collimating lens system providing a collimated image of the screen 23 of the CRT 22 of the instrument 19 to the optical inputs 11 and 17.

Of course, it is not necessary for the instruments of the RVD unit to be CRT display instruments as shown at 19; they may be of any alternative image-providing instrument, for example a collimated electromechanical device.

The RVD unit 1 can also include a second bank 25 of instruments, disposed above the first bank 18, to be viewable by the pilot when looking downwardly. Thus, this will provide a head-down type of display. Of course, it is a major advantage of the apparatus of the present invention that, with its wide field of view, and in view of the small instrument size which can be attained because of the fact that the instruments can be positioned close to the optical inputs 11 and 17, many additional banks of instruments can be provided, although only one additional bank is indicated in the drawings, the third bank, shown at 26.

As the RVD unit 1 is positioned behind the pilot's helmet 4, it will normally be well away from window areas of the cockpit, so that problems caused by high ambient light level will be avoided. However, in order to mitigate further the effects of stray light, it is preferred that the exterior of the helmet 4 should be non-reflecting e.g. matt black.

FIGS. 1 and 2 show the optical inputs 11 and 17 as being close together, so that the display of a single instrument (instrument 19, for example) is displayed to eyes 12 and 13 simultaneously, even though the RVD unit 1 is relatively close to the helmet 4. In this connection, it has been found that because the images are displayed at infinity, it is of no practical consequence that the inputs 11 and 17 are not spaced apart, as are human eyes, because when looking at optical infinity, the ability to perceive stereoscopically is nil.

However, it is important to provide binocular vision primarily to avoid retinal suppression but, in this apparatus, it is believed that by having a binocular display the eyes are genuinely focussed at infinity and are therefore more able to pick-up small objects at long range in featureless surroundings; it also establishes a binocular look from the eyes which is particularly important for air-to-air visibility.

The RVD unit 1 may be either directly attached to the frame of the aircraft, or be incorporated in the pilot's seat.

In the drawings, the optical inputs 11 and 17 are shown as being at the level of the plane containing the pilot's normal, straight ahead lines of sight (see line X—X), the first bank 18 of instruments also lying in this plane. In fact, it can, in some circumstances, be advantageous to have the optical inputs 11 and 17 set at a lower level, so that they, and the bank 18 of instruments, lie in the plane containing the line X"-X". By this means, it is possible to arrange that the optical inputs 11 and 17 are closer to the axes of rotation of the pilot's head, and thus to reduce the distance over which these inputs move when the pilot moves his head.

It will readily be appreciated that it is not essential for the inputs 11 and 17 to view the RVD unit directly. Instead, it can be arranged that the RVD unit is viewed by the optical inputs 11 and 17 via a mirror. For example, the RVD unit 1 could be moved downwardly through 90° so that the plane containing line X—X then lies on a plane containing the line X'—X', a plane mirror being placed with its reflecting surface lying in the plane containing the line Y—Y, to be at 45° to the planes containing lines X—X and X'—X'.

From the foregoing, it will be appreciated that in use of the RVD system described above, the pilot will see presented in front of him at optical infinity images of the instruments 180° behind him, so that the pilot is in effect looking through the back of his helmet. Thus, the space in his normal field of vision can be entirely free of instruments. In view of the wide field of view of the system, and also the degree of miniaturisation of instrumentation which can be employed while maintaining an adequate size of perceived display (because of the closeness of the RVD unit to the RVD helmet), a very large number of instruments can easily be accommodated for displaying information to the pilot through the system. In this connection, it should be noted that the HUD systems used at present have porthole angles of 8° to 15° with conventional optics and up to 30° with diffraction optics, whereas it is possible with the present invention to have a corresponding angle of 60°, 80° or even 100°; theoretically this angle can be as high as 180°.

A particular display instrument which can be incorporated into the RVD unit 1 is a display instrument to be fed by a TV camera mounted to give a downwards, forwards view out of the aircraft. The instrument could be mounted at the centre of an upper bank of the instruments of the RVD unit 1, so that the pilot would see displayed the output of the TV camera when he looked downwards, in the same direction as the TV camera points. Thus, in effect, the pilot would be able to see through the cockpit floor. If the camera were such as to be able to provide better vision than the unaided eye under poor visibility conditions, then this system would be useful even where a pilot's vision in the direction covered by the camera was not obstructed.

Instead of the arrangement shown in FIGS. 1 and 2, wherein the endoscope means are incorporated with the helmet, and the combiner means attached to the helmet independently of the endoscope means, an RVD helmet can be produced by slipping an adaptor unit over the outside of the normal helmet. The adaptor unit is generally of ring-shaped form, and is made up of two endoscope devices suitably linked together at their ends, with the combiner means also attached to the adaptor unit.

For the avoidance of doubt, it is pointed out that the term "helmet" as used herein in relation to apparatus in accordance with the present invention means any kind of headgear which may be placed on the head to support the combiner means and endoscope means to be positioned on the head of a wearer for the display of information from the information source. Thus, for example, in a simple form, the support may be in the form of one or more pads to which the combiner means and endoscope means are attached, the pad or pads serving to position the combiner means and endoscope means on the head of the wearer. Alternatively, in another simple form, the support can be constructed similarly to spectacles, in that it can be held on the head of the wearer simply by resting on the ears and nose of the wearer. Further, the helmet may be at least partly formed by the endoscope means and/or by the combiner means, i.e. in a simple form, the endoscope means and/or combiner means comprise the helmet.

An alternative form of combiner means is illustrated by FIG. 3 and is in the form of a visor 30 to be worn across the pilot's face. The inner surface 31 of the visor may be a partially silvered mirror but a dichroic reflecting film is preferably used.

As shown the visor 30 has an upper and a lower face 32 and 33 meeting at an acute angle. The shaping and geometry of the visor is such that an image, provided by endoscope means 34, is reflected from the lower face 33, to the upper face 32 and thence into the pilot's eye 35. The endoscope means 34 are vertically below the pilot's eye 35 and thus will pass below the pilot's ear (not shown) to the rear of the helmet.

Three light rays, identified by one, two and three chevrons, indicate the action of the optics in presenting a true image to the pilot.

It is preferred, when the RVD system is incorporated in a helmet that the combiner means be positioned inside any other visor or face plate forming part of the helmet, this being to prevent any change in the presentation of the display to the pilot.

I claim:

1. Apparatus for use by an observer together with a physically separate collimated information source display to transmit a binocular display at infinity of the information source display to each eye of the observer from a location generally behind the observer, comprising a support to be worn on the observer's head, two combiner means positioned on said support, one of each of the said combiner means being within the field of view of each of the said observer's eyes, input means mounted on the said support means and generally diametrically opposite said combiner means so as to be located in the area of the back of the observer's head in use of the apparatus and with the collimated information source display within the field of view of the input means, and two endoscope means arranged to receive and transmit the same image of said collimated information source from said input means to each of said combiner means, the optical center axes of each of said combiner means being parallel to the optical center axis of the said input means, the apparatus being constructed and arranged such that in use, with the collimated information source display being located behind and physically separate from said observer, an identical image of said collimated information source display is transmitted via said input means and said endoscope means to each of said combiner means thereby providing the same but separate images of the information source display projected at infinity within the field of each of the observer's eyes.

2. Apparatus as claimed in claim 1 wherein the information source consists of a bank of instruments each supplying a separate collimated display of information.

3. Apparatus as claimed in claim 1 wherein the information source display consists of a cathode ray tube, the screen of which forms the reticule of the source, and a collimating lens system focused on the screen.

4. Apparatus as claimed in claim 1 wherein the combiner means comprise a single visor constructed and arranged to be in front of the observer's eyes, the inner surface of the viser being selected from the group consisting of a partially silvered mirror or having a dichroic reflecting film.

5. Apparatus as claimed in claim 1 wherein the endoscope means comprise a pair of endoscopes, each having its own input means, and the input means of the two endoscopes being closely adjacent each other so as to have substantially the same field of view.

6. Apparatus as claimed in claim 1 wherein the endoscope means are fiber optic devices.

7. Apparatus as claimed in claim 1 wherein the combiner means, endoscope means and input means are mounted on a helmet for a pilot, such that the information source display can be mounted to one of the pilot's seat or the air frame of an aircraft.

8. Apparatus as claimed in claim 2 wherein additional banks of instruments are provided above and below the information source display giving head-down displays as well as head-up displays.

* * * * *